United States Patent Office 3,462,839
Patented Aug. 26, 1969

3,462,839
DENTAL COMPOSITIONS AND PROCESS
Raymond F. Boyer and Dallas G. Grenley, Midland, and Robert H. Anspaugh, Bay City, Mich., assignors to The Dow Chemical Company, Midland, Mich., a corporation of Delaware
No Drawing. Filed June 10, 1966, Ser. No. 556,567
Int. Cl. A61k 5/02; A61c 5/00
U.S. Cl. 32—15                    10 Claims

ABSTRACT OF THE DISCLOSURE

This invention is directed to improved dental cement compositions and methods of significantly enhancing the adhesion of conventional dental cements to tooth structures. More particularly, it is directed to the use of certain vinylidene chloride interpolymers in conjunction with conventional dental cements whereby unexpected improved adherance of such cements to tooth structures is achieved.

---

Materials presently used for dental restoration, e.g. fillings for teeth, do not exhibit satisfactory adhesion to the tooth structure without reliance on mechanical adhesion obtained by extensive and undesirable drilling of channels or tubes into the structure to be covered or filled.

In accordance with the present invention, the adhesion of conventionally employed dental cements to a tooth structure is significantly enhanced, thereby reducing the necessity for extensive drilling, by admixing the formable dental cement with a vinylidene chloride interpolymer consisting essentially of from about 40 to 90 percent by weight of polymerized vinylidene chloride and from about 60 to 10 percent by weight of one or more dissimilar monoethylenically unsaturated comonomers. Application of the admixture to a tooth structure to be covered or filled forms a cement which is cohesive and homogeneous and exhibits significantly improved adhesion to the surface to which it is applied. Further, such dental compositions are readily settable to form hard and strong but not brittle materials; are non-irritating to the tissues of the mouth; are dimensionally stable during and after setting; are insoluble, particularly in mouth fluids; have a linear coefficient of expansion essentially the same as that of the tooth structure; have low thermal conductivity; and have excellent chemical stability during storage as well as use.

The dental cements which may be used include any conventionally employed material.

Illustrative of widely used materials are the zinc phosphate cements consisting essentially of a mixture of zinc oxide and magnesium oxide, generally in the ratio of about ten parts of zinc oxide and one part of magnesium oxide; and the silicate cements comprising essentially a ground mass of silica and alumina, which are fused together with calcium fluoride or beryllium silicates as fluxes. Each of the above referred to cements are generally dispersed in a mixture of orthophosphoric acid, buffer salts and water. Also useful are the zinc oxide-eugenol cements, the copper cements, and the silver cements.

In general, when preparing an admixture of a formable dental cement and a vinylidene chloride interpolymer of the type as herein defined, it is preferred to admix such dental cement, by any suitable means, with an interpolymeric latex containing between about 40 and 60 percent by weight of interpolymer solids. Further, such interpolymeric latexes are in an amount sufficient to provide between about 5 and 25 parts by weight of interpolymer solids per 100 parts by weight of the cementitious constituent of the unmodified dental cement.

By the term "latex" is meant, an aqueous colloidal dispersion of the defined interpolymeric thermoplastic, resinous materials which may be manufactured by the emulsion polymerization of such interpolymerizable materials or by the aqueous dispersion of finely divided particles of such interpolymers. Such latexes may contain known dispersants and emulsifiers.

Exemplary of materials which may be interpolymerized with the required amounts of vinylidene chloride monomer are those materials having the general formula:

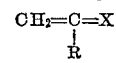

wherein R is selected from the group consisting of hydrogen and the methyl group and X is selected from the group consisting of —CN, halogens of atomic numbers 9 to 35 and ester-forming groups —COOY, wherein Y is selected from the group consisting of a primary alkyl group and a secondary alkyl group, each of the foregoing alkyl groups containing from 1 to 18 carbon atoms inclusively.

Illustrative of the secondary or dissimilar interpolymerizable monomeric materials applicable in the preparation of suitable interpolymer latexes can be methyl acrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, cetyl acrylate, octadecenyl acrylate, methyl methacrylate, ethyl methacrylate, propyl methacrylate, butyl methacrylate, n-amyl methacrylate, sec.-amyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butyoxyethyl acrylate or methacrylate or other alkoxyethyl acrylates or methacrylates, vinyl halides (e.g. vinyl chloride, vinyl bromide, etc.), acrylonitrile, methacrylonitrile, and the like.

Representative types of vinylidene chloride-containing interpolymer latexes which have been discovered to be highly satisfactory in the present invention include the following interpolymer latexes designated and differentiated in the following Chart A by the approximate percentage weight compositions of the organic interpolymerizable monomeric components contained in each individual latex.

CHART A.—VINYLIDENE CHLORIDE-CONTAINING INTERPOLYMER LATEX COMPOSITIONS

| Organic monomer components | | | | | | | | | | | |
|---|---|---|---|---|---|---|---|---|---|---|---|
| Vinylidene chloride | 40 | 60 | 89 | 90 | 50 | 88 | 50 | 52 | 70 | 75 | 75 | 75 |
| Vinyl chloride | | | | | | | 40 | 35 | 20 | 20 | 20 | 20 |
| Ethyl acrylate | 60 | 40 | | | 40 | 7 | 10 | | 10 | 5 | | 3 |
| Methyl methacrylate | | | 10 | 10 | | | | | | | | 2 |
| 2-ethylhexyl acrylate | | | | | | | | 13 | | | | |
| Acrylonitrile | | | 11 | | | 5 | | | | | 5 | |

By way of further illustration, in each of a series of a series of experiments a previously extracted human tooth was sawed into halves and the individual halves drilled and wired near the ends fartherest from the sawed surface to permit pulling the halves apart under tension. The halves were then cemented together using a mixture composed of equal proportions by weight of (a) a silicate cement comprising essentially a ground mass of silica and alumina dispersed in a liquid composed essentially of orthophosphoric acid and water, and (b) a vinylidene chloride interpolymer latex composed of an aqueous emulsion of 75 weight percent vinylidene chloride, 20 weight percent vinyl chloride, 3 weight percent ethylacrylate and 2 weight percent methyl methacrylate, such latex containing about 50 weight percent of interpolymer solids. The halves were then pulled in tension to measure the adhesion of the cement to the tooth structure. A force of 8 p.s.i. was required to separate the halves with the break occuring both at the bond between the cement and the tooth wall and in the cement itself. The above experiment was repeated in the absence of the orthophosphoric acid. A force of 155 p.s.i. was required to separate the halves with the break occuring in the cement. By way of comparison, a separate experiment was conducted utilizing the silicate cement described herein (dispersed in a liquid mixture of orthophosphoric acid and water) without the addition of a vinylidene chloride interpolymer latex. This sample required only 1 p.s.i. of force to separate the halves with the break occuring at the bond between the cement and the tooth.

Similar good results were obtained in separate experiments, conducted as described herein, where the silicate cement was replaced by a bridge and crown cement consisting essentially of a mixture of about ten parts of zinc oxide and one part of magnesium oxide dispersed in a liquid composed essentially of buffering salts and water, and with and without orthophosphoric acid.

In another embodiment of the present invention it has also been discovered that desirable results may be obtained by first applying an essentially continuous coating of a vinylidene chloride interpolymer latex (as heretofore described) on the tooth structure to be covered or filled, followed by the application of the formable dental cement or cement-interpolymer mixture thereto, then allowing the material to harden.

Similar good results as specifically set forth herein are obtained utilizing any of the vinylidene chloride interpolymeric latexes described, in the manner prescribed by the present invention.

What is claimed is:

1. Settable dental cement compositions having enhanced adhesion to tooth structures said compositions consisting essentially at (1) a formable dental cement selected from the group consisting of zinc phosphate cements, silicate sements, zinc oxide-eugenol cements, copper cements and silver cements, and (2) admixed therewith between about 5 and 25 parts by weight per 100 parts by weight of dental cement solids, of a thermoplastic interpolymer of from about 40 to about 90 weight percent vinylidene chloride and from about 60 to 10 weight percent of one or more dissimilar monoethylenically unsaturated comonomers.

2. The dental composition of claim 1 wherein said monoethylenically unsaturated comonomer is selected from the group having the formula $$CH_2=C-X$$
$$\phantom{CH_2=C-}|$$
$$\phantom{CH_2=C-}R$$

wherein R is selected from the group consisting of hydrogen and the methyl group and X is selected from the group consisting of —CN, halogens of atomic numbers 9 to 35, and ester-forming groups —COOY, wherein Y is selected from the group consisting of a primary alkyl group and a secondary alkyl group, and wherein each of said alkyl groups contain from 1 to 18 carbon atoms.

3. The composition of claim 2 wherein said vinylidene chloride interpolymer is an interpolymer of about 75 percent by weight vinylidene chloride, about 20 percent by weight vinyl chloride, about 3 percent by weight ethyl acrylate and about 2 percent by weight methyl methacrylate.

4. A process for promoting the adhesion of a dental cement to a tooth structure comprising contacting said tooth structure with a formable mixture consisting essentially of (1) a dental cement selected from the group consisting of zinc phosphate cements, silicate cements, zinc oxide-eugenol cements, copper cements and silver cements, and (2) admixed therewith between about 5 and 25 parts by weight, per 100 parts by weight of dental cement solids, of a thermoplastic interpolymer of from about 40 to about 90 percent by weight vinylidene chloride and between about 60 and 10 percent by weight of at least one dissimilar ethylenically unsaturated comonomer.

5. The process of claim 4 wherein said monoethylenically unsaturated comonomer is selected from the group having the formula $$CH_2=C-X$$
$$\phantom{CH_2=C-}|$$
$$\phantom{CH_2=C-}R$$

wherein R is selected from the group consisting of hydrogen and the methyl group and X is selected from the group consisting of —CN, halogens of atomic numbers 9 to 35, and ester-forming groups —COOY, wherein Y is selected from the group consisting of a primary alkyl group and a secondary alkyl group, and wherein each of said alkyl groups contain from 1 to 18 carbon atoms.

6. The process of claim 5 wherein said vinylidene chloride interpolymer is an interpolymer of about 75 percent by weight vinylidene chloride, about 20 percent by weight vinyl chloride, about 3 percent by weight ethyl acrylate and about 2 percent by weight methyl methacrylate.

7. The process of claim 4 wherein said interpolymer is in the form of an interpolymeric latex containing between about 40 and 60 percent by weight of interpolymer solids.

8. A process for promoting the adhesion of formable dental cements selected from the group consisting of zinc phosphate cements, silicate cements, zinc oxide-eugenol cements, copper cements and silver cements, to tooth structures which comprises the sequential steps of (1) applying to said structures an essentially continuous coating of a thermoplastic vinylidene chloride interpolymeric latex containing between about 40 and 60 percent by weight of an interpolymer containing essentially from about 40 to about 90 percent by weight of vinylidene chloride and from about 60 to about 10 percent by weight of at least one dissimilar monoethylenically unsaturated comonomer, (2) allowing said coating to dry to a film, (3) applying said dental cement to the coated surfaces, and (4) allowing said cement to harden.

9. The process of claim 8 wherein said monoethylenically unsaturated comonomer is selected from the group having the formula $$CH_2=C-X$$
$$\phantom{CH_2=C-}|$$
$$\phantom{CH_2=C-}R$$

wherein R is selected from the group consisting of hydrogen and the methyl group and X is selected from the group consisting of —CN, halogens of atomic numbers 9 to 35, and ester-forming groups —COOY, wherein Y is selected from the group consisting of a primary alkyl group and a secondary alkyl group, and wherein each of said alkyl groups contain from 1 to 18 carbon atoms.

10. The process of claim 9 wherein said vinylidene chloride interpolymer latex is an interpolymer of about 75 percent by weight vinylidene chloride, about 20 percent by weight vinyl chloride, about 3 percent by weight ethyl acrylate and about 2 percent by weight methyl methacrylate.

References Cited

UNITED STATES PATENTS

| 2,558,139 | 6/1951 | Knock et al. | 32—15 X |
| 3,250,736 | 5/1966 | Gibbs et al. | 260—29.6 |
| 3,297,613 | 1/1967 | Gibbs et al. | 260—29.6 |

FOREIGN PATENTS

| 967,587 | 8/1964 | Great Britain. |

ROBERT PESHOCK, Primary Examiner

H. DINITZ, Assistant Examiner

U.S. Cl. X.R.

106—35; 260—29.6